United States Patent [19]

Ball et al.

[11] Patent Number: 5,531,894
[45] Date of Patent: Jul. 2, 1996

[54] METHOD OF TREATING WASTEWATER

[75] Inventors: Harold L. Ball; Terry R. Bounds, both of Roseburg; Eric S. Ball, Winchester; Jeffrey L. Ball, Roseburg, all of Oreg.

[73] Assignee: Orenco Systems, Inc., Roseburg, Oreg.

[21] Appl. No.: 154,592

[22] Filed: Nov. 18, 1993

[51] Int. Cl.[6] ................................................. C02F 3/30
[52] U.S. Cl. .................... 210/605; 210/617; 210/615; 210/620; 210/622; 210/629; 210/800; 210/805
[58] Field of Search ..................... 210/800, 805, 210/605, 607, 608, 622, 532.2, 195.1, 621, 615, 629, 620

[56] References Cited

U.S. PATENT DOCUMENTS

| | | | |
|---|---|---|---|
| 3,567,629 | 3/1971 | Ayers et al. | |
| 3,662,890 | 5/1972 | Grimshaw | 210/621 |
| 3,666,106 | 5/1972 | Green | 210/605 |
| 4,251,359 | 2/1981 | Colwell et al. | 210/622 |
| 4,279,753 | 7/1981 | Nielson et al. | 210/615 |
| 4,439,323 | 3/1984 | Ball | 210/608 |
| 4,895,645 | 1/1990 | Zorich, Jr. | 210/98 |
| 5,288,407 | 2/1994 | Bodwell et al. | 210/622 |

OTHER PUBLICATIONS

Enhanced Nitrogen Removal Using a Modified Recirculating Sand Filter by Sandy et al., from the 5th ASAE Conference Dec. 14–15, 1987.

Ekofinn Bioclere™ brochure on, self-contained wastewater treatment plants copyrighted 1986, p. 4.

Ekofinn Bioclere brochure for Bioclere Systems Published Nov. 17, 1994, Four Pages.

The Bioclere Process (Typical Bioclere System) Published Nov. 17, 1994, Two pages.

*Primary Examiner*—Ana Fortuna
*Attorney, Agent, or Firm*—Chernoff, Vilhauer, McClung & Stenzel

[57] ABSTRACT

A method of improving the quality of septic tank effluent is disclosed. Sewage wastewater having a significant concentration of waste solids is flowed to a septic tank. In the septic tank the solids are allowed to separate from the wastewater to form a relatively clear horizontal liquid layer between sludge and scum layers. At least a portion of the liquid layer is flowed from a recirculation outlet through an aerobic filter to produce a filter effluent. The filter effluent is flowed to the septic tank. A septic tank effluent is discharged from a septic tank discharge outlet which is spaced apart from the inlet and which is in fluid communication with the liquid. The septic tank effluent has reduced levels of total nitrogen, BOD and total suspended solids.

10 Claims, 3 Drawing Sheets

METHOD OF TREATING WASTEWATER

BACKGROUND OF THE INVENTION

This invention relates to wastewater treatment, and more particularly to an improved method of treating wastewater in a septic tank.

A septic tank typically provides primary wastewater treatment for domestic wastewater where municipal treatment facilities are unavailable. In a conventionally operated septic tank raw sewage wastewater, having a significant concentration of waste solids, enters one end of the tank and travels through the tank to a discharge end of the tank. In the septic tank, solids separate from the liquid portion of the sewage. Solids having a lower density than the liquid move to the top of the liquid to form a scum layer, and the solids having a higher density than the liquid sink to the bottom of the tank to form a sludge layer, resulting in a relatively clear liquid layer between the scum and the sludge. The liquid portion of the wastewater which exits the discharge end of the tank by means of gravity, a pump, or a siphon, is the septic tank effluent.

The quality of the septic tank effluent primarily determines the appropriate secondary treatment for the wastewater prior to final disposal and is generally measured by the biochemical oxygen demand (BOD), total suspended solids (TSS), and total nitrogen present in the effluent. Since the BOD and total nitrogen concentrations of the septic tank effluent primarily determine the size and kind of the secondary waste treatment facilities, improving the quality of the septic tank effluent quantitatively reduces the secondary treatment necessary to produce a secondary effluent meeting or exceeding post-secondary treatment standards.

Nitrogen in wastewater may exist as organic nitrogen, ammonia, nitrite, and nitrate. The nitrogen present in fresh wastewater is primarily organic nitrogen combined in proteinaceous matter and urea. Decomposition of the organic material by bacteria present in the anaerobic environment of the septic tank readily changes the organic nitrogen to ammonia nitrogen. Thus, in conventionally treated septic tank effluent, nitrogen is present primarily as ammonia nitrogen.

Secondary treatment of septic tank effluent is typically an aerobic treatment which reduces the BOD and TSS of the effluent to acceptable levels prior to discharge of the secondary effluent. In addition, in an aerobic environment, bacteria oxidize ammonia nitrogen to nitrate nitrogen, a process known as nitrification. Thus, in a conventional system nitrogen in this secondary effluent is present primarily as nitrate nitrogen. However, it is desirable to minimize the nitrate concentration of the secondary effluent to about 10 mg-N/L, which is the nitrate concentration allowed by the U.S. EPA drinking water standards.

In order to remove nitrogen from the system, nitrate nitrogen must be converted to a readily removable gaseous form of nitrogen. This conversion can be accomplished biologically under anoxic (without oxygen) or anaerobic conditions by several genera of denitrifying bacteria. Denitrifying bacteria are capable of converting nitrate to nitrite, followed by production of nitric oxide (NO), nitrous oxide ($N_2O$) and nitrogen gas ($N_2$). The last three compounds are gaseous products that are released to the atmosphere and are thus removed from the system. The conversion is known as denitrification. However, in order to remove nitrogen from the system, the denitrifying bacteria also require a source of carbon for cell-synthesis. Conventionally treated nitrate-laden liquid does not contain a source of carbon for the denitrifying bacteria since the aerobic process producing the nitrate-laden secondary effluent removes carbon sources by reducing the BOD.

U.S. Pat. No. 4,895,645 to Zorich, Jr. discloses a filter which receives ammonia-laden septic tank effluent in an anaerobic chamber. A portion of the ammonia-laden liquid from the anaerobic chamber is circulated to an aerobic filter where the ammonia is converted to nitrate, and a portion of the ammonia-laden liquid is recirculated back to the anaerobic chamber. The nitrate-laden filtrate from the aerobic filter is returned to the anaerobic chamber to mix with incoming septic tank effluent and undergo denitrification. At certain times, a portion of the liquid from the anaerobic chamber, now laden with ammonia and nitrate, is discharged to a drainfield. Sediment from the anaerobic chamber is returned to the septic tank. Denitrification, or nitrogen removal, in the anaerobic chamber is not efficient because of the large volume of ammonia-laden liquid which is recirculated only through the anaerobic portion of the filter. Denitrification in the septic tank is not efficient because only a small volume of liquid, which also contains both ammonia nitrogen and nitrate nitrogen, is returned to the septic tank. Since no large volume of nitrate-laden liquid is anaerobically treated, liquid discharged from the filter will always contain a fairly high ammonia concentration as well as an appreciable nitrate concentration.

Sandy, et al. in "Enhanced Nitrogen Removal Using a Modified Recirculating Sand Filter ($RSF^2$)," Proceedings of 5th ASAE Conf. 161 (December 1987), disclose a system which receives septic tank effluent laden with ammonia in a gravel storage zone of a modified recirculating sand filter. A portion of the liquid from the gravel storage zone is distributed over an aerobic filter, where ammonia nitrogen is converted to nitrate nitrogen, and the nitrate-laden aerobic filter effluent is mixed with the ammonia-laden liquid in the storage zone. Ammonia- and nitrate-laden liquid from the storage zone may be discharged or recycled to the septic tank. While some denitrification may take place in the septic tank, the process is inefficient because the nitrate-laden liquid is diluted with ammonia-laden liquid before it is recycled to the septic tank. In addition, the volume of liquid recycled to the septic tank is not as great as the volume of liquid aerobically treated, so all the nitrate-laden liquid is not returned to the septic tank.

Some systems, such as the BIOCLERE® system marketed by Ekofinn of Federal Way, Wash., discharge septic tank effluent to a baffled sump from which liquid is pumped and distributed over an aerobic filter. Filter effluent is returned to the sump, and the liquid in the sump therefore contains both ammonia nitrogen and nitrate nitrogen. Liquid and solids from the bottom of the sump are periodically returned to the septic tank. However, since the effluent from the aerobic filter is always diluted in the sump with ammonia-contaminated septic tank effluent, it is not possible to attain high volume nitrate reduction and, thus, nitrogen must always be present in the liquid discharged as effluent from the sump.

U.S. Pat. No. 3,567,629 to Ayers, et al. discloses a process for treating sewage. An aerobic sump receives septic tank effluent via a draft tube where the septic tank effluent is mixed with the filter effluent from an aerobic filter. Liquid and solids from the bottom of the sump are redistributed over the aerobic filter, and no recirculation to the septic tank is provided. Liquid is periodically discharged from the sump. Thus, both ammonia nitrogen and nitrate nitrogen will be present in the sump, and little denitrification can take place because the sump is maintained in an aerobic condition.

Thus, what is still needed is an effective method of improving the quality of septic tank effluent by reducing effluent levels of total nitrogen, BOD and suspended solids.

SUMMARY OF THE INVENTION

The problems associated with a conventionally operated septic tank are addressed in the present invention by providing an improved method of treating sewage wastewater in a septic tank.

Sewage wastewater having a significant concentration of waste-solids is flowed to a septic tank through an inlet which is in fluid communication with the septic tank. In the septic tank the solids are allowed to separate from the wastewater and to distribute into a lower horizontal sludge layer and an upper horizontal scum layer with a relatively clear horizontal layer of liquid between the sludge and scum layers. At least a portion of the liquid is flowed from a recirculation outlet, which is in fluid communication with the liquid and which is spaced-apart from the inlet, through an aerobic filter to produce a filter effluent. The filter effluent is collected, and flowed to the septic tank. A septic tank effluent is discharged from a septic tank discharge outlet which is spaced-apart from the inlet and which is in fluid communication with the liquid.

As the wastewater passes through the septic tank from the inlet to the recirculation outlet, bacteria present in the anaerobic environment of the septic tank convert organic nitrogen to ammonia nitrogen. Thus the portion of the liquid flowed to the aerobic filter is laden with ammonia. In the aerobic filter, nitrification, or the conversion of ammonia nitrogen to nitrate nitrogen, takes place. Preferably, substantially all of the nitrate-laden aerobic filter effluent is flowed into the septic tank. In the anaerobic environment of the septic tank, conversion of nitrate nitrogen to gaseous nitrogen products, or denitrification, occurs. The organic material in the septic tank provides an external source of carbon for the denitrifying bacteria.

In addition, as liquid from the septic tank flows through the aerobic filter, the BOD and suspended solids present in the liquid are also reduced.

Preferably, the accumulated flow of ammonia-laden liquid to the aerobic filter over an extended time is substantially greater than the accumulated discharge of septic tank effluent over the same time period, to insure that substantially all of the ammonia-laden liquid is aerobically filtered.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 4 is a sectional view taken along line 4—4 of FIG. 1.

DETAILED DESCRIPTION OF THE PREFERRED EMBODIMENTS

Figure 1:
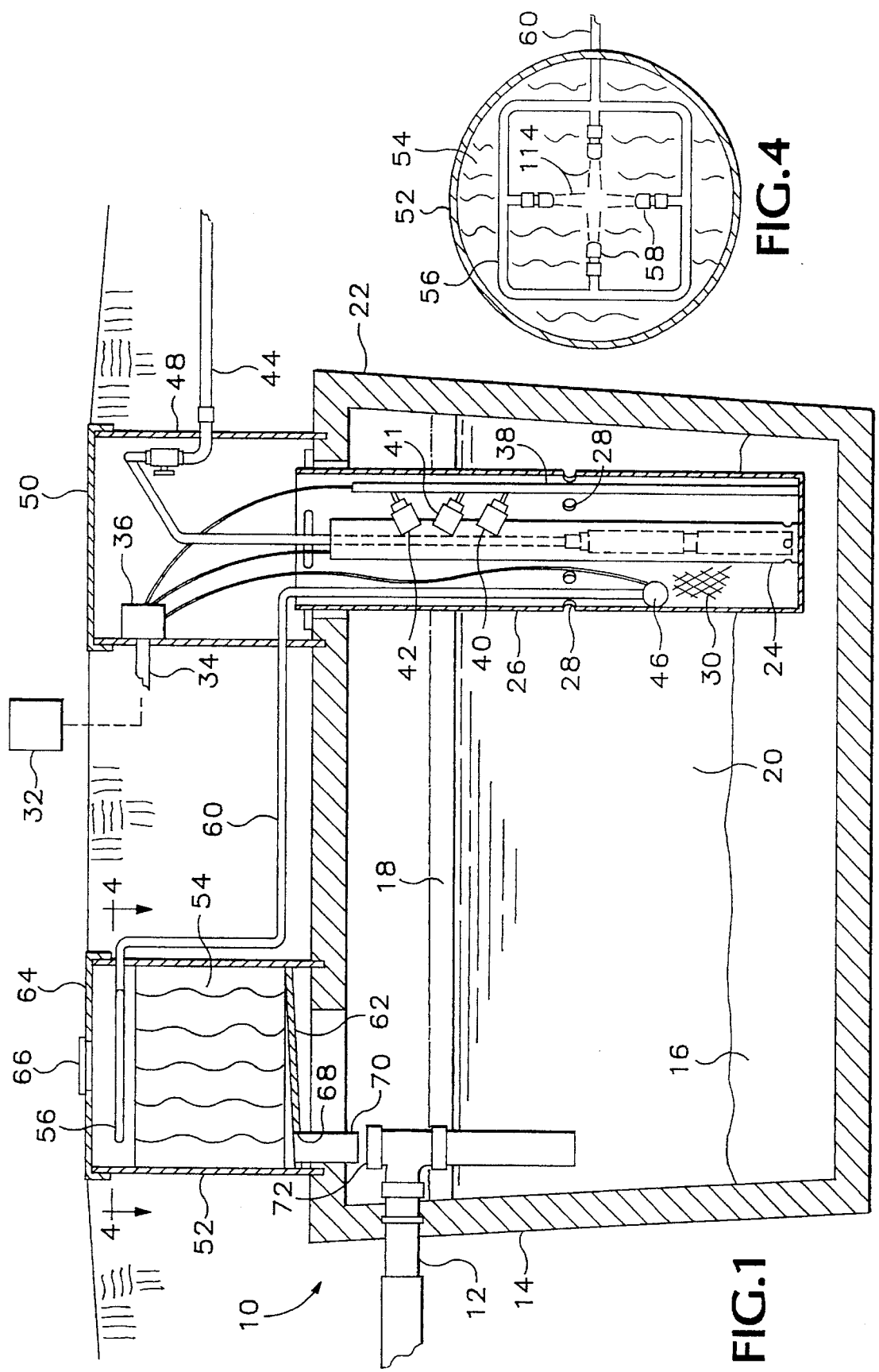
FIGS. 1–3 are sectional side views of exemplary septic tanks embodying the present invention.

Referring now to an exemplary first embodiment illustrated in FIG. 1, a septic tank 10 receives, typically from a residence, raw sewage wastewater having a significant concentration of waste solids through an inlet 12 located at one end 14 of the septic tank. The septic tank may be made of a suitable material such as fiberglass or concrete. In the septic tank gravity and bacteria operate to divide the wastewater into three layers. The solids separate from the wastewater to distribute into a lower horizontal sludge layer 16 and an upper horizontal scum layer 18 with a relatively clear central horizontal liquid layer 20.

At a second end 22 of the septic tank 10, an effluent pump 24 is located in a cylindrical housing or vault 26, which includes an encircling horizontal row of apertures 28 in the vertical walls of the vault. Nested in spaced relationship in the vault 26 is a filter or screen 30. This effluent pumping assembly is described in more detail in U.S. Pat. No. 4,439,323 to Ball which is hereby incorporated by reference.

A control panel 32 controls the operation of the effluent pump 24 through an electrical conduit 34 connected to a splice box 36 in response to a float assembly 38 which includes a redundant off/low level alarm float 40, a timer override off float 41 and a timer override on/alarm float 42. When activated, the effluent pump 24 discharges septic tank effluent out of the septic tank 10 through a septic tank discharge outlet 44 which is located at the second end 22 of the septic tank. A recirculation pump 46 is located in the screened vault 26, and is controlled by the control panel 32. A riser 48 having a lid 50 contains the splice box 36 and provides access to the screened vault 26. It is noted that the recirculation pump 46 could alternatively be housed in a separate screened vault next to screened vault 26 at the second end 22 of the septic tank.

An aerobic filter 52, which may be of any structural non-corrosive material such as PVC or fiber-glass, is located proximate the septic tank 10 at the influent or first end 14 of the septic tank. The aerobic filter 52 contains filter media 54 such as coarse sand, or a synthetic media of, for example, PVC corrugated sheets or lengths of pipe, or randomly packed pieces of polymeric material, to which microorganisms attach to form a fixed film biological growth. As shown in FIG. 4, a distribution manifold 56 with sprayer heads 58, located above the media 54 in the filter 52, is connected by a conduit 60 to the recirculation pump 46. The aerobic filter 52 has a sloping bottom 62, and a lid 64 which includes a carbon filter 66 for absorbing odors and allowing air circulation to the aerobic filter. The bottom 62 of the filter defines an outlet aperture 68 which is located at the low end of the slope and which is connected to an outlet conduit 70 for flowing aerobic filter effluent from the aerobic filter to the septic tank through a filter effluent inlet 72 located proximate the first end 14 of the septic tank.

Figure 2:
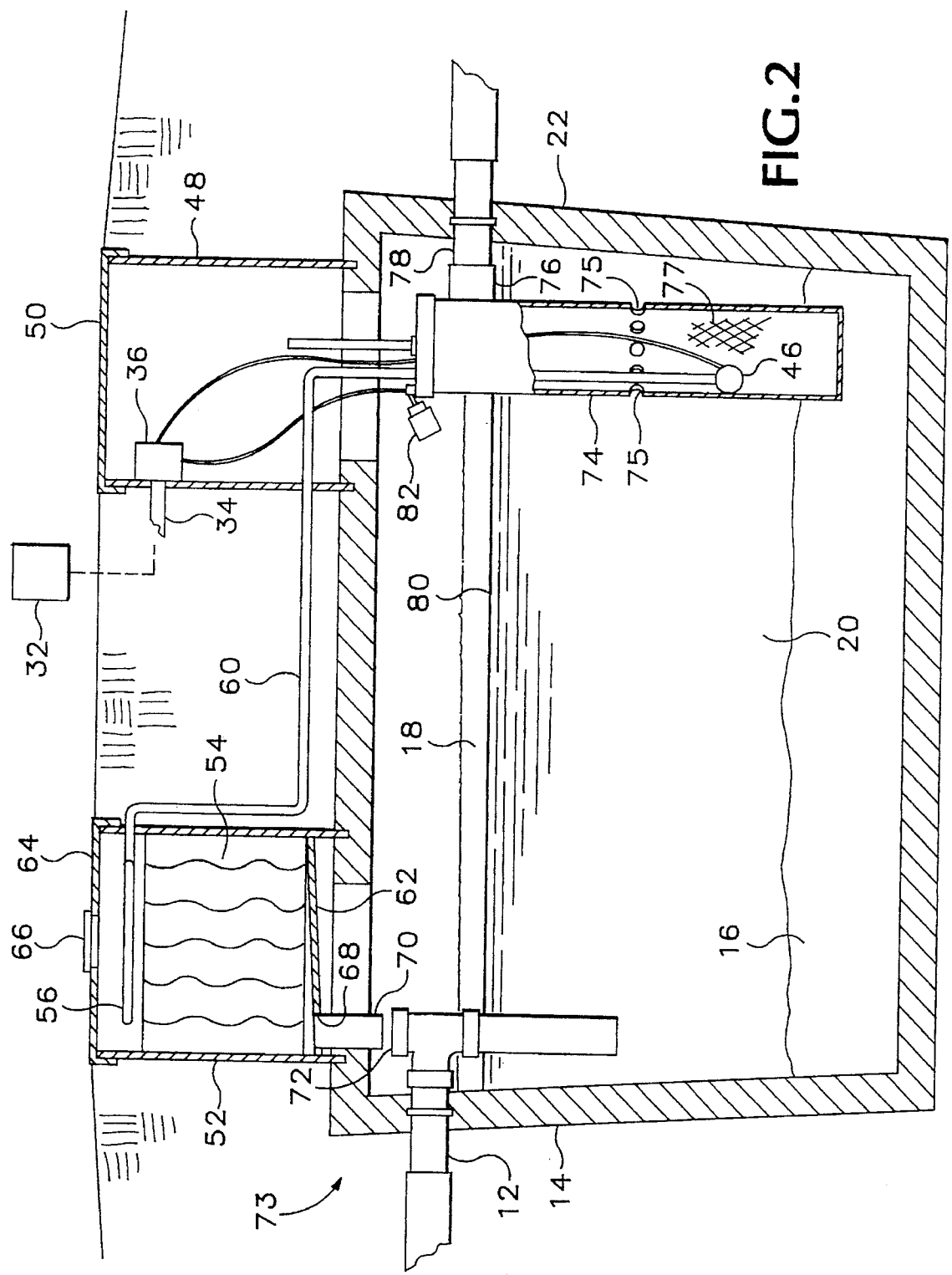
Figure 3:
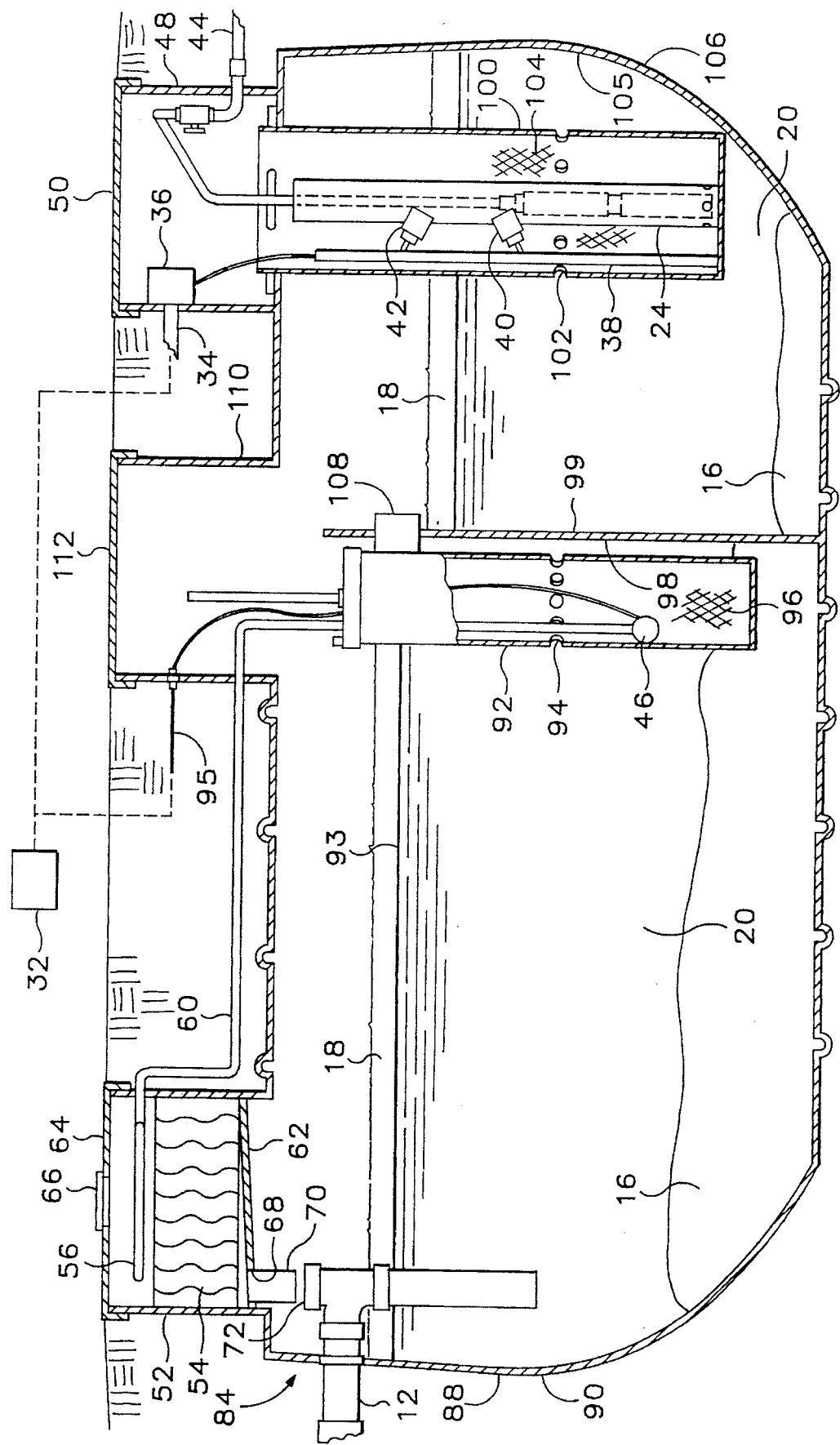

Alternative embodiments of the present invention are shown in FIGS. 2 and 3, and like structures are identified by like numbers. As shown in FIG. 2, effluent may be discharged from a septic tank 73 by gravity flow. In the septic tank 73, which is similar to septic tank 10, the recirculation pump 46 is located at the second end 22 of the septic tank in a vault 74 which includes apertures 75 and a screen 77 and which is similar to the previously described vault 26. A septic tank discharge outlet 76 discharges effluent from the screened vault 74 through a discharge conduit 78 when the level 80 of liquid in the septic tank rises to the level of the outlet 76. A high liquid alarm 82 is connected through the splice box 36 to the control panel 32. The riser 48 and lid 50 provide access to the screened vault 74.

As illustrated in FIG. 3, a two-compartment septic tank 84, which typically has a larger volume capacity than a single-compartment septic tank such as the septic tanks 10 and 73 previously described, receives wastewater through an inlet 12 at a first end 88 of a first compartment 90. A vaults 92 having apertures 94 and a screen 96, and which is similar to the previously described vault 26, is located at a second end 98 of the first compartment 90. The recirculation pump 46 is located in the screened vault 92 and is connected by an electrical conduit 95 to the control panel 32. Liquid is transferred by gravity flow from the screened vault 92 in the first compartment 90 through the vault discharge outlet 108 to the second compartment 106 when the level 93 of liquid in the first compartment 90 rises to the level of the outlet 108. A riser 110 having a lid 112 is located to provide access to the vault 92. A vault 100 with apertures 102 and a screen 104, which is similar to vault 26 and the previously described effluent pumping assembly, is located at a second end 105 of a second compartment 106, and contains the effluent pump 24 and float assembly 38. It is noted that the screened vault 92 and recirculation pump 46 could alternatively be located at the first end 99 or the second end 105 of the second compartment with a suitably located riser 110 and a conventional gravity discharge outlet (not shown) from the first compartment 90 to the second compartment 106.

In operation, raw wastewater containing a significant concentration of solids enters the septic tank at the inlet end 12. In the anaerobic environment of the septic tank, the solids separate from the wastewater to distribute into the sludge layer 16 and the scum layer 18, and bacteria convert the organic nitrogen in the raw wastewater to ammonia nitrogen. The recirculation pump 46 pumps a portion of the ammonia-laden liquid from the liquid 20 layer through the conduit 60 to the distribution manifold 56 located in the aerobic filter 52. The liquid is forced through spray nozzles (not shown) or, as shown in FIG. 4, through the sprayer heads 58 in impinging liquid jets 114 and is distributed over the media 54 in the aerobic filter 52.

The filter media 54 supports a biological film or a slime layer which is formed by a population of microorganisms. As liquid flows down through the filter media, the microorganisms in the slime layer degrade or oxidize the organic material present in the liquid, thus reducing the BOD. The nitrifying bacteria present in the slime layer convert the ammonia nitrogen present in the liquid to nitrate nitrogen. The liquid passes through the filter to the sloped bottom 62 of the filter 52, and the aerobic filter effluent flows by gravity through the outlet conduit 70 of the aerobic filter. The nitrate-laden aerobic filter effluent, undiluted by any other liquid, flows to the filter effluent inlet 72 of the septic tank.

As the population of microorganisms in the filter media increases, the slime layer grows until the microorganisms nearest the filter media can no longer receive adequate nutrients to sustain their growth. Portions of the slime layer may slough off the media. These sloughed off portions are also flowed through the filter outlet conduit 70, and inlet 72, into the septic tank.

In the septic tank, denitrifying bacteria under anoxic or anaerobic conditions convert nitrate-nitrogen to gaseous nitrogen products. The organic matter present in the septic tank provides the denitrifying bacteria with the carbon necessary for cell growth. The rate of denitrification (the conversion of nitrate-nitrogen to gaseous nitrogen products) linearly decreases with increasing dissolved oxygen and virtually ceases at dissolved oxygen concentrations greater than or equal to 1.0 milligram per liter. Thus, the pumping rate of the recirculation pump is maintained at a rate that insures that the contents of the septic tank remain primarily anaerobic. The recirculation pump may be programmed to pump continuously or intermittently. At a preferred pumping rate, the pump pumps about 1–2 gallons of liquid per minute, a rate which insures circulation of all the liquid in the septic tank through the aerobic filter, yet which is low enough to avoid turbulence that might disturb the scum and sludge layers.

At periodic intervals effluent is discharged from the septic tank to a drain field or to any further desired treatment, for example, by effluent pump 24 or by gravity flow through the discharge conduit 78. The accumulated volume of the flow to the aerobic filter over an extended period of time is substantially greater than the accumulated volume of septic tank effluent discharged over the same period of time. Thus, it is at least probable that all of the effluent which is discharged from the septic tank has first undergone substantially complete nitrification in the aerobic filter (conversion of ammonia-nitrogen to nitrate-nitrogen) and substantially complete denitrification in the septic tank (conversion of nitrate-nitrogen to gaseous nitrogen products) and virtually all the nitrogen originally present in the wastewater has been removed. In addition, since the accumulated volume of the flow to the aerobic filter over a substantial period of time is greater than the accumulated volume of septic tank effluent discharged over the same period of time, the BOD and total suspended solids of the septic tank effluent will be substantially lower than the BOD and TSS of the wastewater entering the septic tank. The septic tank effluent produced by the method of the present invention has a significantly improved quality compared to effluent from a conventionally operated septic tank which consequently permits a quantitative reduction in secondary treatment.

The BOD, TSS and total nitrogen of septic tank effluent were determined for wastewater treated according to the present invention. A 1000-gallon, single-compartment fiberglass septic tank was installed for a new two-bedroom home in Roseburg, Oreg. in November 1990. Effluent from the septic tank was dosed to a 32-ft$^2$ sand filter. An aerobic filter was added at the influent end of the septic tank on Aug. 15, 1993, resulting in a system similar to the system illustrated in FIG. 1. Daily wastewater flow to the septic tank averages 115 gpd, which was also the tank's discharge rate. Daily flow through the aerobic filter averaged 2500 gpd.

The septic tank effluent was periodically sampled, and the BOD, TSS, and nitrogen levels were determined. The results are presented in Tables 1 and 2 below.

TABLE 1

Average Septic Tank Effluent Quality
Before Retrofit with Aerobic Filter

| mg/L | | mg-N/L | | |
|---|---|---|---|---|
| BOD$_5$[a] | TSS[b] | TKN[c] | NH$_3$ | NO$_3$[d] |
| 175 | 28 | 66 | 54 | 2 |

[a]BOD$_5$ = 5-day biochemical oxygen demand
[b]TSS = total suspended solids
[c]TKN = total Kjeldahl nitrogen, the sum of organic nitrogen and ammonia nitrogen (NH$_3$).
[d]NO$_3$ = nitrate nitrogen Table 1 shows the average quality of the septic tank effluent during the first 2.5 years of operation of the septic tank.

TABLE 2

Average Septic Tank Effluent Quality
Following Retrofit with Aerobic Filter

| | mg/L | | mg-N/L | | |
|---|---|---|---|---|---|
| | $BOD_5$[a] | $TSS$[b] | $TKN$[c] | $NH_3$ | $NO_3$[d] |
| 8-25-93 | 61 | 25 | 57 | 37 | 3 |
| 9-9-93 | — | — | 35 | 24 | 3 |
| 9-16-93 | — | 9 | 11 | 7 | 7 |
| 9-22-93 | 36 | 16 | 16 | 10 | 3 |
| 9-30-93 | — | — | 14 | 11 | 2 |
| 10-4-93 | 48 | 27 | 11 | 9 | 2 |
| 10-7-93 | — | — | 20 | 8 | 7 |
| 10-13-93 | 20 | 5 | 10 | 2 | 6 |
| 10-20-93 | 15 | 8 | 5 | 4 | 6 |
| 11-1-93 | — | 13 | 14 | 10 | 5 |

[a]$BOD_5$ = 5-day biochemical oxygen demand
[b]$TSS$ = total suspended solids
[c]$TKN$ = total Kjeldahl nitrogen, the sum of organic nitrogen and ammonia nitrogen ($NH_3$).
[d]$NO_3$ = nitrate nitrogen.

As shown in Table 2, when wastewater is treated according to the present invention, the total nitrogen present in septic tank effluent immediately begins to decrease as the slime layer on the aerobic filter media begins to grow. Once the slime layer has become well established the total nitrogen levels are reduced, on average, more than 70% compared to the nitrogen levels in the conventionally treated wastewater, and the nitrate levels approach the standards established for drinking water.

In addition, the BOD and total suspended solids in the effluent are significantly reduced. Although the strength of the influent wastewater from the home will vary somewhat from day to day, wastewater treated according to the present invention will result in septic tank effluent having an average BOD of less than 30 mg/L and an average TSS of less than 15 mg/L compared to conventionally treated wastewater having an average BOD of 175 mg/L and an average TSS of 28 mg/L.

A further reduction of nitrogen, if desired, can be accomplished by treating the septic tank effluent in an anaerobic environment such as an anaerobic upflow filter. Effluent from a septic tank treated as described in the present invention, for example from the discharge conduit 78 as shown in FIG. 2, can be flowed to the bottom or inlet of an anaerobic upflow filter (not shown) containing a filter media such as coarse sand, or a synthetic media of PVC corrugated sheets or lengths of pipe, or randomly packed pieces of polymeric material. The submerged media in the anaerobic environment of the anaerobic upflow filter provides a large surface area to support the growth of a fixed film of denitrifying microorganisms. Denitrification (the conversion of nitrate-nitrogen to gaseous nitrogen products) will occur efficiently because of the low level of dissolved oxygen in the anaerobic upflow filter. After passing through the anaerobic upflow filter, the anaerobically treated anaerobic filter effluent will be discharged from an outlet to a drain field or to any desired further treatment.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of treating sewage wastewater, comprising:
   (a) flowing sewage wastewater having a significant concentration of waste solids into a septic tank through an inlet which is in fluid communication with said septic tank, and allowing said solids to separate from said wastewater and to distribute into a lower horizontal sludge layer and an upper horizontal scum layer with a relatively clear horizontal layer of liquid therebetween;
   (b) flowing at least a portion of said liquid from recirculation outlet, which is in fluid communication with said liquid and which is spaced apart from said inlet, through an aerobic filter to produce a filter effluent, and while in said aerobic filter, flowing said liquid through a filter media containing microorganisms from said septic tank which have adhered to and are growing on said media and thereby forming nitrate in said filter effluent;
   (c) flowing substantially all of said aerobic filter effluent resulting from said portion into said septic tank after removal thereof from said filter, while maintaining the content of said septic tank primarily anaerobic and while in said septic tank converting a substantial portion of said nitrate by denitrification to gaseous nitrogen compounds;
   (d) repeating steps (b) and (c); and
   (e) permanently discharging from said septic tank a septic tank effluent from a septic tank discharge outlet which is spaced apart from said inlet and which is in fluid communication with said liquid.

2. The method of claim 1 wherein the accumulated volume of the flow of said filter effluent occurring in step (d) over an extended period of time is greater than the accumulated volume of septic tank effluent discharged in step (e) over the same period of time.

3. A method of treating sewage wastewater, comprising:
   (a) flowing sewage wastewater having a significant concentration of waste solids into a septic tank through an inlet which is in fluid communication with said septic tank, and allowing said solids to separate from said wastewater and to distribute into a lower horizontal sludge layer and an upper horizontal scum layer with a relatively clear horizontal layer of liquid therebetween;
   (b) flowing at least a portion of said liquid from a recirculation outlet, which is in fluid communication with said liquid and which is spaced apart from said inlet, through an aerobic filter to produce a filter effluent, and while in said aerobic filter, flowing said liquid through a filter media containing microorganisms from said septic tank which have adhered to and are growing on said media and thereby forming nitrate in said filter effluent;
   (c) flowing substantially all of said aerobic filter effluent resulting from said portion into said septic tank after removal thereof from said filter, while maintaining the content of said septic tank primarily anaerobic and while in said septic tank converting a substantial portion of said nitrate by denitrification to gaseous nitrogen compounds;
   (d) repeating steps (b) and (c); and
   (e) discharging from said septic tank a septic tank effluent from a septic tank discharge outlet separate from said recirculation outlet, the accumulated volume of the flow of said filter effluent occurring in step (d) over an extended period of time being greater than the accumulated volume of septic tank effluent discharged over the same period of time.

4. The method of claim 3 wherein step (e) comprises discharging said septic tank effluent permanently from said septic tank with said discharge outlet in fluid communication with said liquid.

5. A method of treating sewage wastewater, comprising:
   (a) flowing sewage wastewater having a significant concentration of waste solids into a septic tank through an inlet which is in fluid communication with said septic tank, and allowing said solids to separate from said wastewater and to distribute into a lower horizontal sludge layer and an upper horizontal scum layer with a relatively clear horizontal layer of liquid therebetween;
   (b) flowing at least a portion of said liquid from a recirculation outlet, which is in fluid communication with said liquid and which is spaced apart from said inlet, through an aerobic filter to produce an aerobically-treated filter effluent, and while in said aerobic filter, flowing said liquid through a filter media containing microorganisms from said septic tank which have adhered to and are growing on said media and thereby forming nitrate in said filter effluent;
   (c) flowing said aerobically-treated filter effluent resulting from said portion substantially undiluted into said septic tank after removal thereof from said filter, while maintaining the content of said septic tank primarily anaerobic and while in said septic tank converting a substantial portion of said nitrate by denitrification to gaseous nitrogen compounds;
   (d) repeating steps (b) and (c); and
   (e) discharging from said septic tank a septic tank effluent from a septic tank discharge outlet which is spaced apart from said inlet and which is in fluid communication with said liquid.

6. The method of claim 5 wherein step (d) comprises flowing substantially all of said filter effluent into said septic tank.

7. The method of claim 5 wherein the accumulated volume of the flow of said filter effluent occurring in step (d) over an extended period of time is greater than the accumulated volume of septic tank effluent discharged in step (e) over the same period of time.

8. The method of claim 5 wherein step (e) comprises permanently discharging said septic tank effluent from said septic tank.

9. A method of treating sewage wastewater, comprising:
   (a) flowing sewage wastewater having a significant concentration of waste solids into a septic tank through an inlet which is in fluid communication with said septic tank, and allowing said solids to separate from said wastewater and to distribute into a lower horizontal sludge layer and an upper horizontal scum layer with a relatively clear horizontal layer of liquid therebetween;
   (b) flowing at least a portion of said liquid from a recirculation outlet, which is in fluid communication with said liquid and which is spaced apart from said inlet, through an aerobic filter to produce an aerobic filter effluent, and while in said aerobic filter, flowing said liquid through a filter media containing microorganisms from said septic tank which have adhered to and are growing on said media and thereby forming nitrate in said aerobic filter effluent;
   (c) flowing substantially all of said aerobic filter effluent resulting from said portion into said septic tank after removal thereof from said filter, while maintaining the content of said septic tank primarily anaerobic and while in said septic tank converting a substantial portion of said nitrate by denitrification to gaseous nitrogen compounds;
   (d) repeating steps (b) and (c);
   (e) discharging from said septic tank a septic tank effluent from a septic tank discharge outlet which is spaced apart from said inlet and which is in fluid communication with said liquid; and
   (f) flowing said septic tank effluent through an anaerobic filter, and while in said anaerobic filter flowing said septic tank effluent through a filter media containing microorganisms and thereby converting said nitrate to gaseous nitrogen compounds.

10. The method of claim 9 wherein step (f) includes flowing said septic tank effluent upwardly through said filter media and submerging said filter media in said septic tank effluent.

* * * * *

UNITED STATES PATENT AND TRADEMARK OFFICE
CERTIFICATE OF CORRECTION

PATENT NO. : 5,531,894

DATED : July 2, 1996

INVENTOR(S) : Harold L. Ball et al.

It is certified that error appears in the above-indentified patent and that said Letters Patent is hereby corrected as shown below:

Col. 4, line 33   Change "fiber-glass" to --fiberglass--

Col. 8, line  9   After "from" insert --a--.

Signed and Sealed this

Twenty-sixth Day of November 1996

Attest:

BRUCE LEHMAN

*Attesting Officer*        *Commissioner of Patents and Trademarks*